US 8,639,249 B2

(12) United States Patent
Gholmieh et al.

(10) Patent No.: US 8,639,249 B2
(45) Date of Patent: *Jan. 28, 2014

(54) METHOD AND APPARATUS FOR CONTROLLING COMMUNICATIONS OF DATA FROM MULTIPLE BASE STATIONS TO A MOBILE STATION IN A COMMUNICATION SYSTEM

(75) Inventors: Aziz Gholmieh, San Diego, CA (US); Peter Gaal, San Diego, CA (US); Edward G Tiedemann, Jr., San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 419 days.

This patent is subject to a terminal disclaimer.

(21) Appl. No.: 12/765,562

(22) Filed: Apr. 22, 2010

(65) Prior Publication Data

US 2010/0202364 A1 Aug. 12, 2010

Related U.S. Application Data

(63) Continuation of application No. 10/274,343, filed on Oct. 18, 2002, now Pat. No. 7,711,363.

(60) Provisional application No. 60/346,987, filed on Jan. 8, 2002, provisional application No. 60/359,005, filed on Feb. 20, 2002.

(51) Int. Cl.
*H04W 36/00* (2009.01)
*H04B 7/00* (2006.01)

(52) U.S. Cl.
USPC ............ 455/436; 455/437; 455/442; 455/525

(58) Field of Classification Search
USPC .................................. 455/436, 437, 442, 525
See application file for complete search history.

(56) References Cited

U.S. PATENT DOCUMENTS

| 5,673,260 A | 9/1997 | Umeda et al. |
| 5,956,641 A | 9/1999 | Bruckert et al. |
| 5,978,365 A | 11/1999 | Yi |
| 6,731,948 B1 | 5/2004 | Lee et al. |

(Continued)

FOREIGN PATENT DOCUMENTS

| RU | 2144283 | 1/2000 |
| WO | WO9911013 A1 | 3/1999 |
| WO | WO9949595 A1 | 9/1999 |

OTHER PUBLICATIONS

European Search Report—EP09173451—Apr. 18, 2010.

(Continued)

*Primary Examiner* — Wen Huang
(74) *Attorney, Agent, or Firm* — Jeffrey D. Jacobs

(57) ABSTRACT

An apparatus and method provides for controlling communications from multiple base stations to a mobile station in a communication system. A mobile station transmitter transmits from the mobile station channel quality indicator data of a first base station. The data is covered with Walsh code assigned to the first base station. A base station receiver receives the transmission of the channel quality indicator data of the first base station. The mobile station transmitter punctures the transmission of the channel quality indicator data of the first base station with null channel quality indicator data, and covers the null channel quality data with Walsh code assigned to a second base station of the multiple base stations to indicate a desire to switch a source of transmission of traffic data from the first base station to the second base station.

64 Claims, 7 Drawing Sheets

(56) References Cited

U.S. PATENT DOCUMENTS

| | | |
|---|---|---|
| 6,747,965 B1 | 6/2004 | Nara et al. |
| 6,842,619 B2 | 1/2005 | Lee et al. |
| 7,065,359 B2 | 6/2006 | Chuah et al. |
| 7,190,964 B2 | 3/2007 | Damnjanovic et al. |
| 2003/0054773 A1 | 3/2003 | Vanghi |
| 2003/0206541 A1 | 11/2003 | Yun et al. |
| 2004/0246917 A1 | 12/2004 | Cheng et al. |

OTHER PUBLICATIONS

Gholmieh, A.: "Base Station Selection for 1x ev-dv," 3GPP2 TSG-C Contributions, C50-20020107-050, pp. 1-7 (Dec. 2008).

International Preliminary Examination Report, PCT/US2003/000136—International Preliminary Examining Authority—IPEA/US—Apr. 16, 2004.

International Search Report, PCT/US2003/000136—International Search Authority—European Patent Office—Jun. 5, 2003.

Tran, J.: "Cell Selection Procedure with One CQICH," 3GPP2 TSG-C Contributions, C30-20020204-047, pp. 1-4 (Feb. 2002).

METHOD AND APPARATUS FOR CONTROLLING COMMUNICATIONS OF DATA FROM MULTIPLE BASE STATIONS TO A MOBILE STATION IN A COMMUNICATION SYSTEM

CROSS REFERENCE TO RELATED APPLICATIONS

Claim of Priority Under 35 U.S.C. §119 and §120

This present application for patent is a continuation and claims priority to U.S. application Ser. No. 10/274,343, filed Oct. 18, 2002 entitled "Method and Apparatus for Controlling Communications of Data from Multiple Base Stations to a Mobile Station in a Communication System", which claims priority to U.S. Provisional Application Ser. No. 60/346,987, filed Jan. 8, 2002 entitled "Method and Apparatus For Using Forward Common Assignment Channel for Call Setup in a CDMA Communication System" and which claims priority to U.S. Provisional Application Ser. No. 60/359,005, filed Feb. 20, 2002 entitled "Method and Apparatus For Using Forward Common Assignment Channel for Call Setup in a CDMA Communication System" and all assigned to the assignee hereof and hereby expressly incorporated by reference herein.

FIELD

The present invention relates generally to the field of communications, and more particularly, to data communications in a communication system.

BACKGROUND

In a communication system, a mobile station may receive data communications from a number of base stations. The mobile station may move from the coverage area of a first base station to a second base station. As a result, the channel condition for receiving communications from the second base station may be more favorable than the first base station. The mobile station, thus, may select the second base station for receiving communications. However, after the selection, the mobile station may not have a reliable method of informing the first base station that a switching of the communication to the second base station is necessary. The method of informing the first base station also need to provide for the communication system a reliable way of timely switching the source of the communication for the mobile station for uninterrupted communications. Therefore, there is a need for a method and apparatus for switching transmissions of data from one base station to another.

SUMMARY

An apparatus and method provides for controlling communications from multiple base stations to a mobile station in a communication system. A mobile station transmitter transmits from the mobile station channel quality indicator data of a first base station of the multiple base stations on a reverse link channel quality indicator channel. The data is covered with Walsh code assigned to the first base station. A base station receiver receives at the first base station the transmission of the channel quality indicator data of the first base station on the reverse link channel quality indicator channel, covered with Walsh code assigned to the first base station. The mobile station transmitter punctures the transmission of the channel quality indicator data of the first base station with null channel quality indicator data, and covers the null channel quality data with Walsh code assigned to a second base station of the multiple base stations. The mobile station transmitter transmits the punctured transmission to the first base station to indicate a desire to switch a source of transmission of traffic data from the first base station to the second base station. The base station receiver receives the punctured transmission of the channel quality indicator data of the first base station with null channel quality indicator data that is covered with Walsh code assigned to the second base station of the multiple base stations. A controller switches the source of transmission of traffic data from the first base station to the second base station based on receiving the punctured transmission.

BRIEF DESCRIPTION OF THE DRAWINGS

The features, objects, and advantages of the present invention will become more apparent from the detailed description set forth below when taken in conjunction with the drawings in which like reference characters identify correspondingly throughout and wherein.

DETAILED DESCRIPTION OF THE PREFERRED EMBODIMENTS

Generally stated, a novel and improved method and apparatus provides for switching source of communications to a mobile station in a communication system for continuing transmission of data to the mobile station. The mobile station is able to inform a first base station of the need for the switching, and receive continuous communications after switching the source of communications from the first base station to a second base station. The switching of the source of communications may be necessary due to a detection of a more favorable channel condition between the mobile station and the second base station. One or more exemplary embodiments described herein are set forth in the context of a digital wireless data communication system. While use within this context is advantageous, different embodiments of the invention may be incorporated in different environments or configurations. In general, the various systems described herein may be formed using software-controlled processors, integrated circuits, or discrete logic. The data, instructions, commands, information, signals, symbols, and chips that may be referenced throughout the application are advantageously represented by voltages, currents, electromagnetic waves, magnetic fields or particles, optical fields or particles, or a combination thereof. In addition, the blocks shown in each block diagram may represent hardware or method steps.

More specifically, various embodiments of the invention may be incorporated in a wireless communication system operating in accordance with the code division multiple access (CDMA) technique which has been disclosed and described in various standards published by the Telecommunication Industry Association (TIA) and other standards organizations. Such standards include the TIA/EIA-95 standard, TIA/EIA-IS-2000 standard, IMT-2000 standard, UMTS and WCDMA standard, all incorporated by reference herein. A system for communication of data is also detailed in the "TIA/EIA/IS-856 cdma2000 High Rate Packet Data Air Interface Specification," incorporated by reference herein. A copy of the standards may be obtained by accessing the world wide web at the address: http://www.3gpp2.org, or by writing to TIA, Standards and Technology Department, 2500 Wilson Boulevard, Arlington, Va. 22201, United States of America. The standard generally identified as UMTS standard, incorporated by reference herein, may be obtained by contacting 3GPP Support Office, 650 Route des Lucioles-Sophia Antipolis, Valbonne-France.

Figure 1:
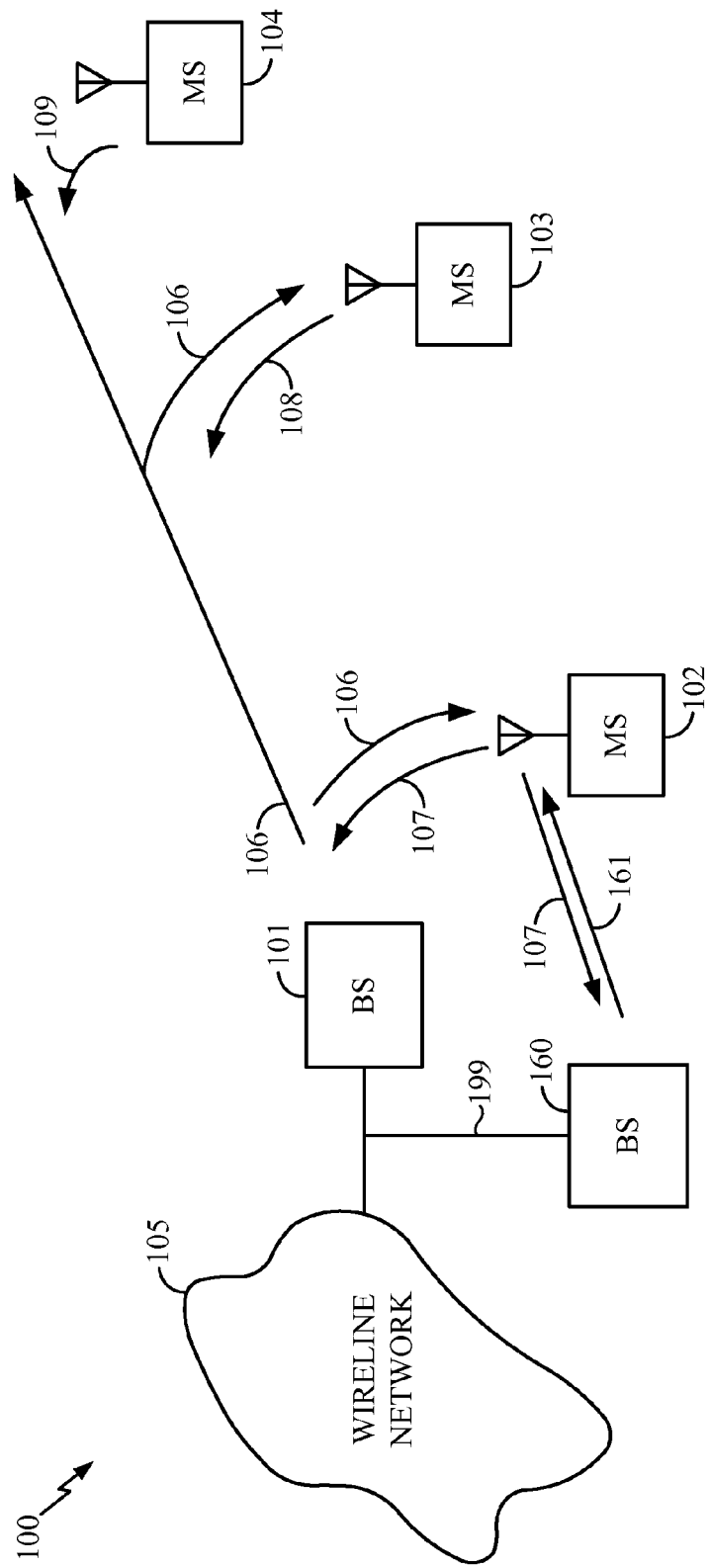
FIG. 1 illustrates a communication system capable of operating in accordance with various embodiments of the invention.

FIG. 1 illustrates a general block diagram of a communication system 100 capable of operating in accordance with any of the code division multiple access (CDMA) communication system standards while incorporating various embodiments of the invention. Communication system 100 may be for communications of voice, data or both. Generally, communication system 100 includes a base station 101 that provides communication links between a number of mobile stations, such as mobile stations 102-104, and between the mobile stations 102-104 and a public switch telephone and data network 105. The mobile stations in FIG. 1 may be referred to as data access terminals (AT) and the base station as data access network (AN) without departing from the main scope and various advantages of the invention. Base station 101 may include a number of components, such as a base station controller and a base transceiver system. For simplicity, such components are not shown. Base station 101 may be in communication with other base stations, for example base station 160. A mobile switching center (not shown) may control various operating aspects of the communication system 100 and in relation to a communication back-haul 199 between network 105 and base stations 101 and 160.

Various aspects of the invention provide for the mobile station to receive continuous communications of data while moving from the coverage area of one base station to coverage area of another base station. Base station 101 communicates with each mobile station that is in its coverage area via a forward link signal transmitted from base station 101. The forward link signals targeted for mobile stations 102-104 may be summed to form a forward link signal 106. Each of the mobile stations 102-104 receiving forward link signal 106 decodes the forward link signal 106 to extract the information that is targeted for its user. Base station 160 may also communicate with the mobile stations that are in its coverage area via a forward link signal transmitted from base station 160. The forward link signal transmitted from a base station may be formed in accordance with a time division multiple access technique. The transmissions to the mobile station may be over a number of time frames. The time frame may have 16 time slots, and each time slot may be 1.25 mSec long. As such, a mobile station may be assigned a time slot for receiving communication from the base station. The mobile stations may decode the received forward link to find whether any data is being communicated for its user. Mobile stations 102-104 communicate with base stations 101 and 160 via corresponding reverse links. Each reverse link is maintained by a reverse link signal, such as reverse link signals 107-109 for respectively mobile stations 102-104. The reverse link signals 107-109, although may be targeted for one base station, may be received at other base stations.

Base stations 101 and 160 may be simultaneously communicating to a common mobile station. For example, mobile station 102 may be in close proximity of base stations 101 and 160, which can maintain communications with both base stations 101 and 160. On the forward link, base station 101 transmits on forward link signal 106, and base station 160 on the forward link signal 161. On the reverse link, mobile station 102 transmits on reverse link signal 107 to be received by both base stations 101 and 160. On the reverse link, both base stations 101 and 160 may attempt to decode the traffic data transmission from the mobile station 102.

The mobile station may select a different base station for transmitting data at different times based on the channel condition. For transmitting a packet of data to mobile station 102, one of the base stations 101 and 160 may be selected to transmit the packet of data to mobile station 102. The selection may be based on the relative channel conditions between the mobile station and each of the base stations. The data rate and power level of the reverse and forward links may be maintained in accordance with the channel condition. The reverse link channel condition may not be the same as the forward link channel condition. The data rate and power level of the reverse link and forward link may be different.

The mobile station may transmit the information relating to the channel condition with each base station in an active set of base stations in a reverse link channel quality indicator (CQI) channel (R-CQICH) to the base stations. The base station may use the CQI information for determining the transmission power level to the mobile station and the transmission data rate. In accordance with various aspects of the invention, the base station uses the transmissions of CQI information from the mobile station on the R-CQICH for determining when to handoff the forward link transmission from one base station to another base station or one sector of a base station to another sector. When a traffic data channel is assigned to the mobile station, the mobile station transmits CQI feedback information on the R-CQICH every 1.25 mSec. Each transmission on the R-CQICH carries either the full CQI information or a differential CQI value. The full CQI information is an absolute value of an estimate of the signal strength of the pilot signal of the base station. The differential CQI value is a positive or negative increment value of the most recently transmitted full CQI value. Differential CQI values are interpreted in a cumulative manner. The best current CQI estimate at the base station is the most recently received full CQI value. In case of differential reporting, the current CQI value is the most recent full CQI value plus the sum of all differential CQI values that were subsequently transmitted. Each R-CQICH transmission is based on a measurement of a particular pilot signal associated with a base station or a sector of a base station. The CQI information is covered by the Walsh code of the pilot signal of the base station that the mobile station has selected to transmit packet data.

Figure 2:
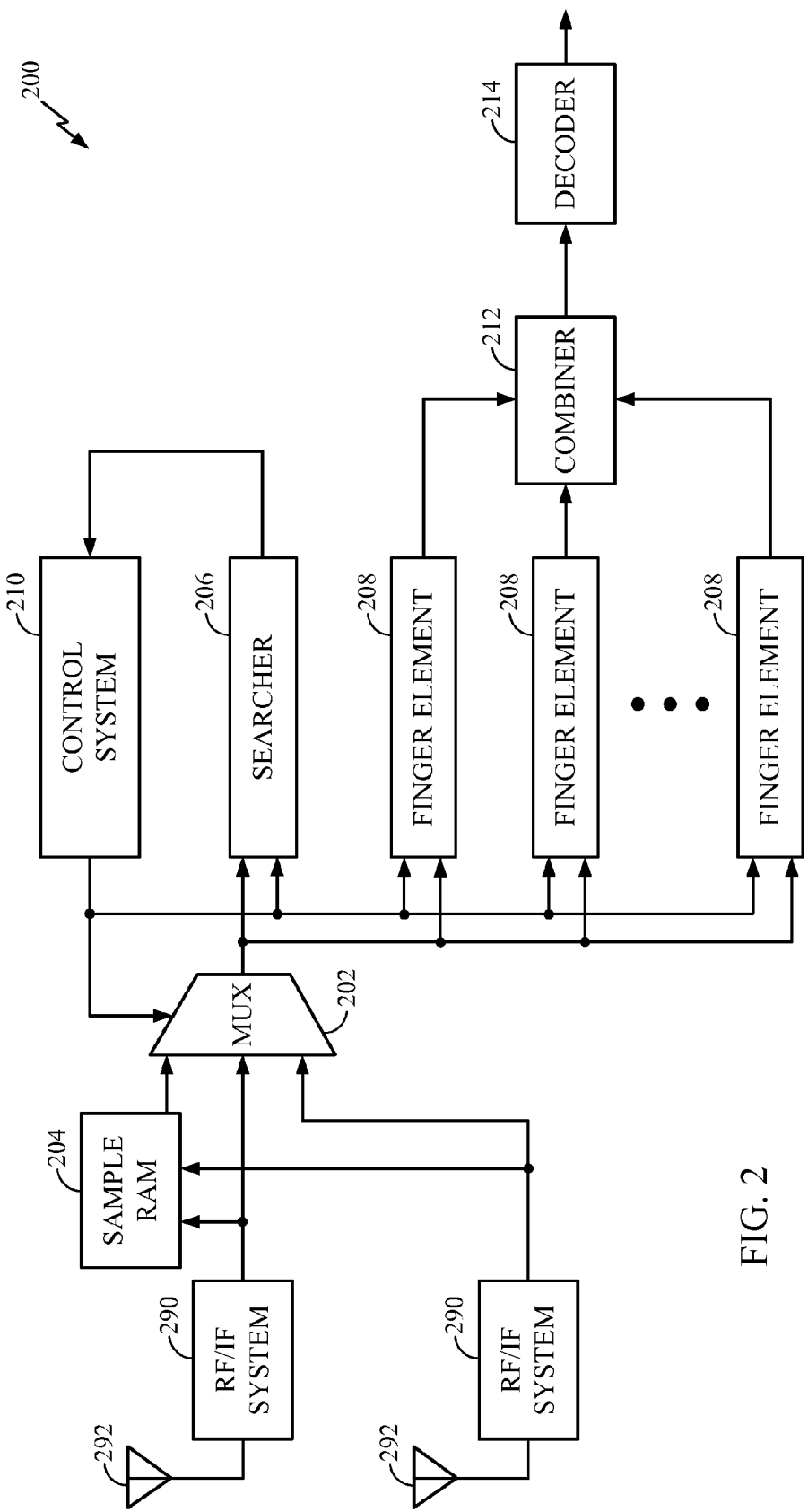
FIG. 2 illustrates a communication system receiver for receiving and decoding received packets of data in accordance with various aspects of the invention.

FIG. 2 illustrates a block diagram of a receiver 200 used for processing and demodulating the received CDMA signal. Receiver 200 may be used for decoding the information on the reverse or the forward links signals including the traffic and pilot channels and the R-CQICH. Received (Rx) samples may be stored in RAM 204. Receive samples are generated by a radio frequency/intermediate frequency (RF/IF) system 290 and an antenna system 292. The RF/IF system 290 and antenna system 292 may include one or more components for receiving multiple signals and RF/IF processing of the received signals for taking advantage of the receive diversity gain. Multiple received signals propagated through different propagation paths may be from a common source. Antenna system 292 receives the RF signals, and passes the RF signals to RF/IF system 290. RF/IF system 290 may be any conventional RF/IF receiver. The received RF signals are filtered, down-converted and digitized to form RX samples at base band frequencies. The samples are supplied to a multiplexer (mux) 202. The output of mux 202 is supplied to a searcher unit 206 and finger elements 208. A control unit 210 is coupled thereto. A combiner 212 couples a decoder 214 to finger elements 208. Control unit 210 may be a microprocessor controlled by software, and may be located on the same integrated circuit or on a separate integrated circuit. The decoding function in decoder 214 may be in accordance with a turbo decoder or any other suitable decoding algorithms.

During operation, received samples are supplied to mux 202. Mux 202 supplies the samples to searcher unit 206 and finger elements 208. Control unit 210 configures finger elements 208 to perform demodulation and despreading of the received signal at different time offsets based on search results from searcher unit 206. The results of the demodulation are combined and passed to decoder 214. Decoder 214 decodes the data and outputs the decoded data. Despreading of the channels is performed by multiplying the received samples with the complex conjugate of the PN sequence and assigned Walsh function at a single timing hypothesis and digitally filtering the resulting samples, often with an integrate and dump accumulator circuit (not shown). Such a technique is commonly known in the art. Receiver 200 may be used in a receiver portion of base stations 101 and 160 for processing the received reverse link signals from the mobile stations, and in a receiver portion of any of the mobile stations for processing the received forward link signals.

The CQI information with each base station may be based on a carrier to interference ratio (C/I) of the signal received from each base station. The pilot data transmitted from each base station may be used to determine the channel condition C/I. The pilot data may be interleaved with the active traffic data channel data. The CQI information may be based on the relative received strength of the pilot data and the traffic channel data. Searcher 206 in connection with control system 210 may rank the channel condition of multiple base stations. Several of the base stations with good channel conditions may be selected to form an active set of base stations. The active set of base stations are capable of communicating with the mobile station at an acceptable level. The mobile station may select one of the base stations in the active set as the best candidate for transmitting data. The selection is communicated to the base stations by covering the CQI information in the R-CQICH with the Walsh code assigned to the selected base station. The base station controller via backhaul 199 directs the data to the selected base station for transmission to the mobile station on the forward link.

Figure 3:
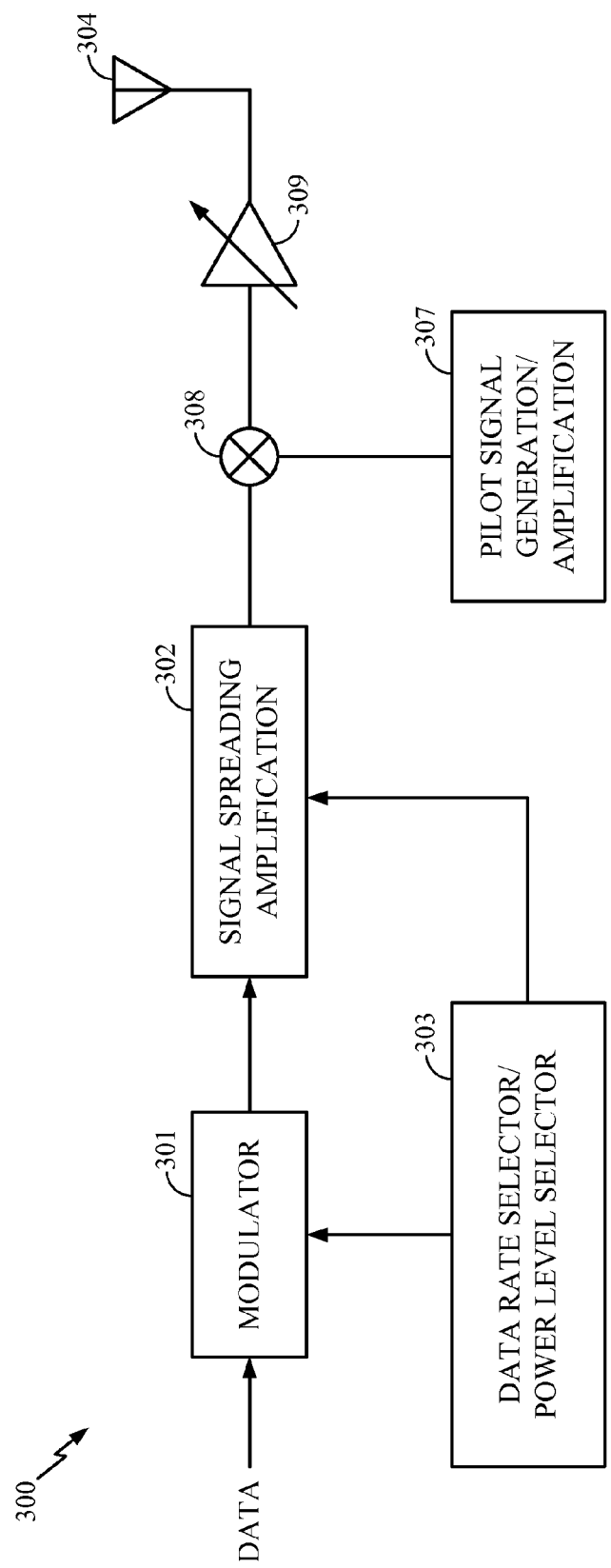
FIG. 3 illustrates a communication system transmitter for transmitting data packets in accordance with various aspects of the invention.

FIG. 3 illustrates a block diagram of a transmitter 300 for transmitting the reverse and forward link signals, including the pilot data, traffic data, and R-CQICH. The channel data for transmission are input to a modulator 301 for modulation. The modulation may be according to any of the commonly known modulation techniques such as QAM, PSK or BPSK. The data is encoded at a data rate in modulator 301. The data rate may be selected by a data rate and power level selector 303. The data in each channel is also covered with a Walsh function. Each channel may be assigned a Walsh function. The CQI channel also has a defined Walsh function. When the CQI channel data is transmitted, the data in covered with an assigned Walsh function that corresponds to the selected base station. For example, there may be a total of six Walsh functions corresponding to six different base stations. The CQI channel data is covered with the assigned Walsh function that corresponds to the selected base station, generally. In accordance with various aspects of the invention, the transmission of the CQI data on the reverse link for a current base station is punctured with null CQI channel data that are covered with the Walsh function assigned to a newly selected base station after the mobile station selects a new base station for communications of data on the forward link. The base station is effectively informed of the new selection based on identifying different Walsh covers in the transmission of the CQI data. The null CQI data may be any data pattern. The data pattern may be predetermined. The null CQI data pattern may also be any random data pattern. In one aspect, the base station while receiving punctured CQI data may ignore the null CQI data. The null CQI data may also have a specific value such that the value recognized by the receiving base station as null CQI data that does not effect the use and operation of the CQI data. Therefore, the null CQI data is used with the Walsh cover of the newly selected base station because the CQI data during such a time may not be needed. In one exemplary embodiment, various aspects of the invention may be incorporated in a communication system operating in accordance with the commonly known CDMA standard in a section referred to by CQI Feedback Operation.

The CQI feedback operation in one aspect includes selection of the data rate for transmission of data based on CQI feedback information received from a receiving destination. The data rate and power level selector 303 accordingly selects the data rate in modulator 301. The output of modulator 301 passes through a signal spreading operation and amplified in a block 302 for transmission from an antenna 304. The data rate and power level selector 303 also selects a power level for the amplification level of the transmitted signal in accordance with the feedback information. The combination of the selected data rate and the power level allows proper decoding of the transmitted data at the receiving destination. A pilot signal is also generated in a block 307. The pilot signal is amplified to an appropriate level in block 307. The pilot signal power level may be in accordance with the channel condition at the receiving destination. The pilot signal is combined with the channel signal in a combiner 308. The combined signal may be amplified in an amplifier 309 and transmitted from antenna 304. The antenna 304 may be in any number of combinations including antenna arrays and multiple input multiple output configurations.

Figure 4:
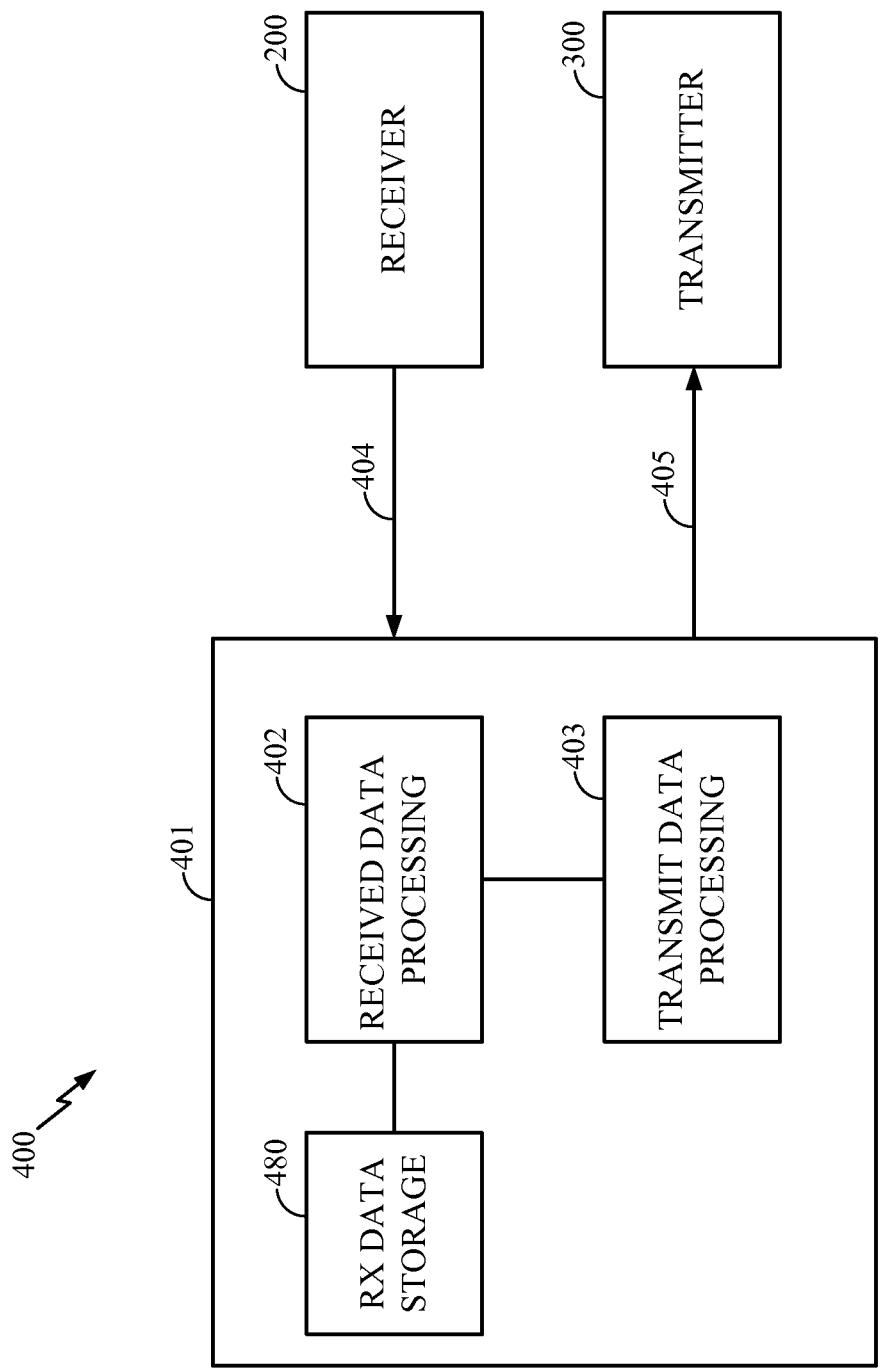
FIG. 4 illustrates a transceiver system capable of operating in accordance with various embodiments of the invention.

FIG. 4 depicts a general diagram of a transceiver system 400 for incorporating receiver 200 and transmitter 300 for maintaining a communication link with a destination. The transceiver 400 may be incorporated in a mobile station or a base station. A processor 401 may be coupled to receiver 200 and transmitter 300 to process the received and transmitted data. Various aspects of the receiver 200 and transmitter 300 may be common, even though receiver 200 and transmitter 300 are shown separately. In one aspect, receiver 200 and transmitter 300 may share a common local oscillator and a common antenna system for RF/IF receiving and transmitting. Transmitter 300 receives the data for transmission on input 405. Transmit data processing block 403 prepares the data for transmission on a transmit channel. Received data, after being decoded in decoder 214, are received at processor 400 at an input 404. Received data are processed in received data processing block 402 in processor 401. The processing of the received data generally includes checking for error in the received packets of data. For example, if a received packet of data has error at an unacceptable level, the received data processing block 402 sends an instruction to transmit data processing block 403 for making a request for retransmission of the packet of data. The request is transmitted on a transmit channel. A receive data storage unit 480 may be utilized to store the received packets of data. Moreover, when the channel condition with a base station begins to deteriorate based on the frequency of retransmit requests and the channel condition C/I, the mobile station may select a new base station. Therefore, processor 401 in connection with control system 210 may be used for determining whether a new base station should be selected based on the error level of the received data from a current base station. The selection of the new base station is communicated, in accordance with various aspects of the invention, by puncturing the R-CQICH transmissions with null CQI data that are covered with the Walsh function of the newly selected base station. Accordingly, the base station controller via backhaul 199 routs the data to the selected base station for transmission to the mobile station on the forward link.

A change in the selected base station may occur at any time, even before the retransmission of the data packet is completed. As such, the receive data storage unit 480 stores data samples of the received data. For example, the system 100 may allow up to four retransmissions of the same data. Before all retransmissions are exhausted, the mobile station may select a new base station. The newly selected base station may continue transmitting data to the mobile station for the remaining number of allowed retransmissions. Alternatively, the newly selected base station may start anew for allowing retransmissions up to the maximum allowed number of retransmissions regardless of the number of retransmissions occurred with the previously selected base station.

Various operations of processor 401 may be integrated in a single or multiple processing units. The transceiver 400 may be incorporated in a mobile station. The transceiver 400 may be connected to another device. The transceiver 400 may be an integral part of the device. The device may be a computer or operates similar to a computer. The device may be connected to a data network, such as Internet. In case of incorporating the transceiver 400 in a base station, the base station through several connections may be connected to a network, such as Internet.

When the mobile station determines that a change of the serving base station is required, the mobile station invokes a sector/cell switching procedure. To initiate the switch, in accordance with at least one exemplary embodiment, the mobile station transmits in accordance with transmission of the R-CQICH for a number of 20 ms periods of time. During the switching period, the R-CQICH transmissions are punctured with transmission of null CQI data with the Walsh cover of the selected base station in a number of time slots in the next time frame. The switching period may last for a number of time frames. In such a case, the R-CQICH transmissions are punctured with transmission of null CQI data with the Walsh cover of the selected base station in a number of time slots for the selected number of time frames as defined by the switching period. The length of the switching period may depend on whether the switching from the current to the selected base station is an inter-cell switch or an intra-cell. An inter-cell sell switching may be between two cells served by respectively the base stations 101 and 160. A intra-cell switching may be between two sectors served by respectively base stations 101 and 160.

Figure 5:
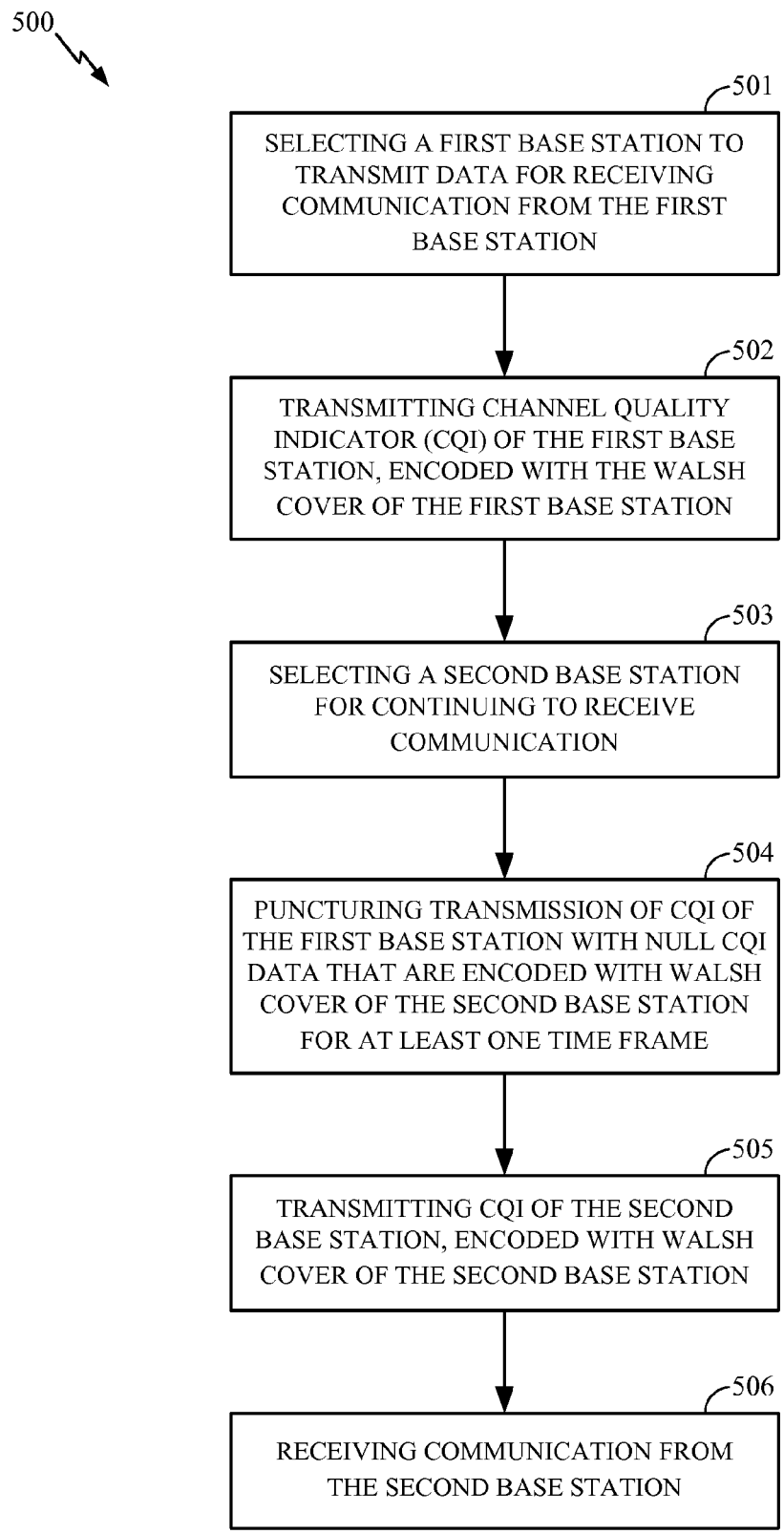
FIG. 5 illustrates a process flow in accordance with various aspects of the invention.

Referring to FIG. 5, a flow diagram 500 provides an exemplary flow of steps that may be performed by a mobile station in communication system 100 in accordance with various aspects of the invention. At step 501, the mobile station may select a first base station to transmit data, and the mobile station may receive data from the selected first base station. The first selected base station may be, for example, base station 101. At step 502, the mobile station transmits on the R-CQICH the CQI information of the first base station by Walsh covering the CQI information with the Walsh code assigned to the first base station. The mobile station, for a number of reasons, such as poor reception from the first base station, may select at step 503 a second base station for continuing to receive communication in the communication system 100. The selection may be based on a number of different criteria, such as receiving a stronger C/I pilot signal level from the second base station. The second base station may be base station 160. At step 504, the mobile station punctures the transmission of the R-CQICH used for transmission of CQI of the first base station with null CQI data. The null CQI data, however, in accordance with an aspect of the invention, is encoded with the Walsh cover of the second base station. The puncturing of the R-CQICH may last for at least one time frame for switching the base stations. During the switching period, the mobile station may continue to receive transmission from the first base station. After the switching period, the mobile station transmits at step 505 the CQI information of the second base station. The CQI information is encoded with the Walsh cover of the second base station. The mobile station, accordingly, receives at step 506 transmissions from the second base station.

Figure 6:
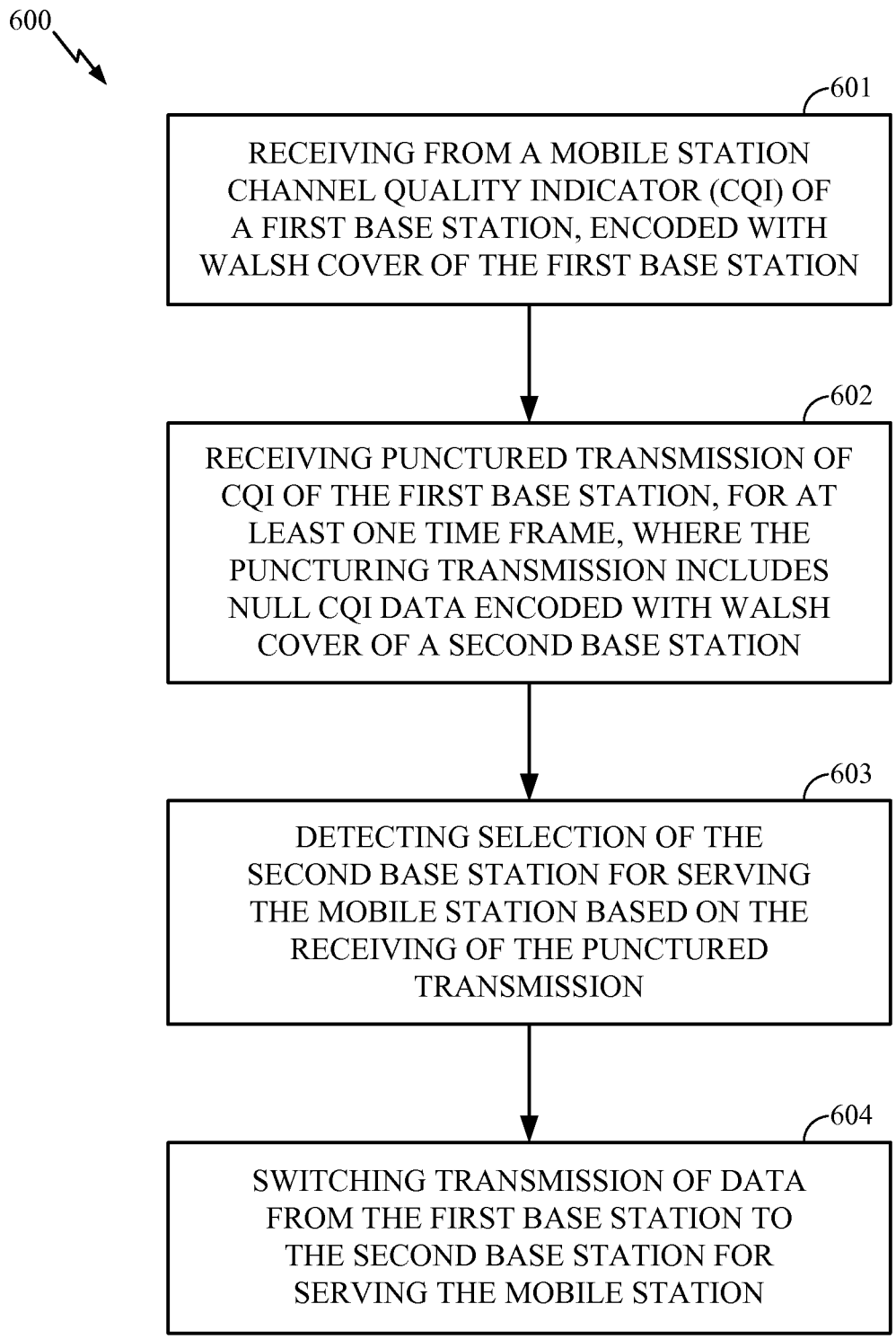
FIG. 6 illustrates a process flow in accordance with various aspects of the invention.

Referring to FIG. 6, a flow diagram 600 provides an exemplary flow of steps that may be performed by a base station in communication system 100 in accordance with various aspects of the invention. At step 601, a first base station receives from a mobile station the CQI information of the first base station. The CQI information is encoded with the Walsh cover of the first base station. The first base station, at step 602, receives punctured transmission of the R-CQICH for at least one time frame. The base station also detects the puncturing transmission includes null CQI information encoded with Walsh covering of a second base station. The base station, at step 603, detects selection of the second base station for serving the mobile station based on the punctured transmission of the R-CQICH. The identification of the second base station may be primarily based on detecting the Walsh cover assigned to the second base station. Accordingly, a base station controller in connection with the first and second base station switches at step 604 transmission of data from the first base station to the second base station. The data for transmission, therefore, is routed, for example via backhaul 199, from the first base station, for example base station 101, to the second base station, for example base station 160.

Figure 7:
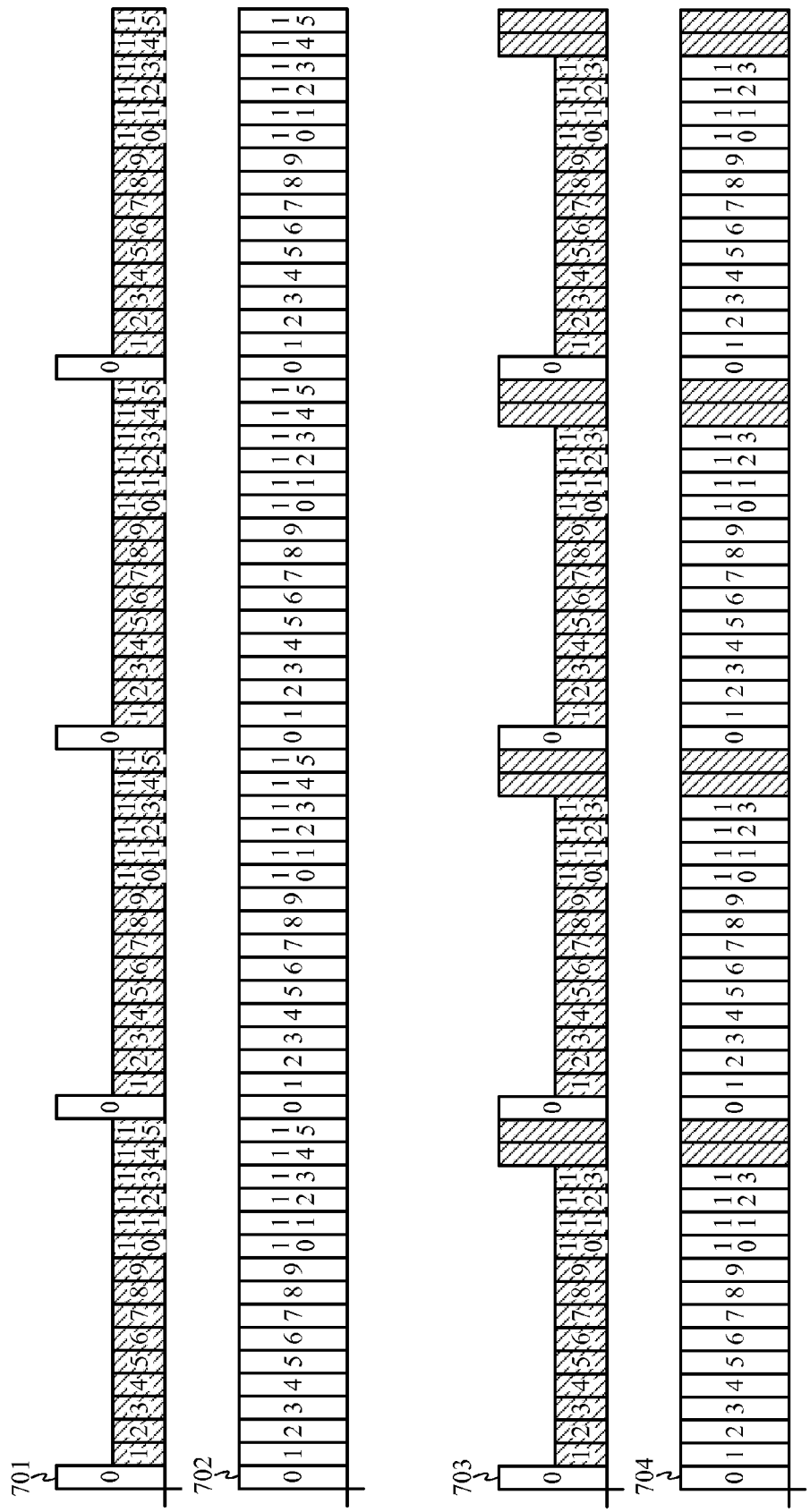
FIG. 7 illustrates transmission of channel quality indicator in accordance with various embodiments of the invention.

There are normally two modes of operation of the R-CQICH: full C/I feedback mode and differential C/I feedback mode. In the full C/I feedback mode, only full C/I reports are sent. In the differential C/I feedback mode, a pattern of full and differential C/I reports is sent. When the mobile station decides to puncture the R-CQICH, it may use the full C/I mode for transmission of the null CQI data covered with the Walsh code of the selected base station. Referring to FIG. 7, two examples of full and differential C/I feedback on the R-CQICH are shown. In the first example 701, the CQI transmission is according to a differential mode transmission. In example 701, the first time slot is used for transmitting the full CQI information. The subsequent time slots in the time frame are used for transmission of the differential CQI information. In the second example 702, the CQI transmission is according to the full CQI transmission mode. In the example 703, a differential mode transmission, the transmission of CQI information on the R-CQICH is punctured during time slots 14 and 15. The puncturing transmissions during time slots 14 and 15 are encoded with the Walsh cover of the newly selected base station. In the example 704, a full mode transmission, the transmission of CQI information on the R-CQICH is punctured during time slots 14 and 15. The puncturing transmissions during time slots 14 and 15 are encoded with the Walsh cover of the newly selected base station. The puncturing of the R-CQICH may be performed at any of the time slots in the time frame, in accordance with various aspects of the invention. For example, the puncturing may be performed at time slots 6 and 7, the middle portion of the time frame. The puncturing may be performed for any number of time slots. The puncturing of R-CQICH may be for several time slots in a time frame and may be staggered over non-contiguous time slots at different times of the time frame. The power level may also be different at each time. The switching period may last for a number of time frames; therefore, the number of time frames used for puncturing may be selected to be at any number. In some cases, where the switching may take a long time, the transition time period may be up to eight time frames. During these eight time frames, the puncturing of R-CQICH may take place in many different possible patterns. Moreover, the CQI data transmitted during the puncturing time may be null data. The null data may be any data pattern. The data pattern is predetermined During the switching period, the receiving base station, by detecting the Walsh cover of a different base station, may determine that switching the routing of data to a different base station should begin or has started already. As such, the first base station may expect to cease transmission to a mobile station within the time frames allocated for the switching period. The second base station after detecting that its Walsh cover is being used during the switching period may begin to prepare to start transmission to the mobile station after the allocated number of time frames. In another aspect, the transmissions of the CQI information on the R-CQICH may be gated. A gated transmission of the R-CQICH may include no transmission during the gated periods. For example, eight out of sixteen possible time slots of one time frame may be gated. During the gated time slots, the transmitter may not transmit at all. As such, the puncturing transmissions of the R-CQICH in accordance with various aspects of the invention may take place during at least one or more time slots that are allowed for transmissions.

Those of skill in the art would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the preferred embodiments is provided to enable any person skilled in the art to make or use the present invention. The various modifications to these embodiments will be readily apparent to those skilled in the art, and the generic principles defined herein may be applied to other embodiments without the use of the inventive faculty. Thus, the present invention is not intended to be limited to the embodiments shown herein but is to be accorded the widest scope consistent with the principles and novel features disclosed herein.

What is claimed is:

1. A method for controlling communications from multiple base stations to a mobile station in a communication system, comprising:
    transmitting data on a reverse channel to a first base station of said multiple base stations;
    puncturing said data with null data, and encoding said null data with a code assigned to a second base station of said multiple base stations; and
    transmitting said punctured data encoded with the code assigned to the second base station to indicate, to the first base station, a desire to switch a source of transmission of traffic data, for said mobile station, from said first base station to said second base station.

2. The method of claim 1, further comprising:
    switching said source of transmission of traffic data from said first base station to said second base station.

3. The method of claim 2, further comprising:
    receiving a traffic data transmission from said second base station.

4. The method of claim 1, further comprising:
    receiving a traffic data transmission from said first base station.

5. The method of claim 1, wherein said puncturing is for a duration of at least one time frame comprising a plurality of time slots.

6. The method of claim 5, wherein said puncturing includes using at least one of said plurality of time slots.

7. The method of claim 1, further comprising:
    selecting said second base station for said source of transmission of traffic data.

8. The method of claim 1, wherein said null data comprises a known data pattern.

9. The method of claim 1, wherein said null data does not affect use of operative data.

10. The method of claim 1, wherein said code comprises a Walsh code.

11. A method for controlling communications from multiple base stations to a mobile station in a communication system, comprising:
- receiving, at a first base station of said multiple base stations, from said mobile station, data on a reverse channel; and
- receiving a punctured transmission of said data punctured with null data, said null data being encoded with a code assigned to a second base station of said multiple base stations to indicate, to the first base station, a desire to switch a source of transmission of traffic data, for said mobile station, from said first base station to said second base station.

12. The method of claim 11, further comprising:
switching said source of transmission of traffic data from said first base station to said second base station.

13. The method of claim 12, further comprising:
transmitting traffic data from said second base station.

14. The method of claim 11, further comprising:
transmitting traffic data from said first base station.

15. The method of claim 11, wherein said punctured transmission is for a duration of at least one time frame comprising a plurality of time slots.

16. The method of claim 15, wherein said punctured transmission includes using at least one of said plurality of time slots.

17. The method of claim 11, further comprising:
selecting said second base station for said source of transmission of traffic data.

18. The method of claim 11, wherein said null data comprises a known data pattern.

19. The method of claim 11, wherein said null data does not affect use of operative data.

20. The method of claim 11, wherein said code comprises a Walsh code.

21. A method for controlling communications from multiple base stations to a mobile station in a communication system, comprising:
- transmitting, from said mobile station, data on a reverse channel to a first base station of said multiple base stations;
- receiving, at said first base station, from said mobile station, said transmission of said data on said reverse channel;
- puncturing said data with null data, and encoding said null data with a code assigned to a second base station of said multiple base stations;
- transmitting, from said mobile station, said punctured data encoded with the code assigned to the second base station to indicate, to the first base station, a desire to switch a source of transmission of traffic data from said first base station to said second base station;
- receiving said punctured data; and
- switching said source of transmission of traffic data from said first base station to said second base station.

22. The method of claim 21, further comprising:
receiving a traffic data transmission from said first base station.

23. The method of claim 22, further comprising:
receiving a traffic data transmission from said second base station.

24. The method of claim 21, wherein said punctured data transmission is for a duration of at least one time frame comprising a plurality of time slots.

25. The method of claim 24, wherein said punctured data transmission includes using at least one of said plurality of time slots.

26. The method of claim 21, further comprising:
selecting said second base station for said source of transmission of traffic data.

27. The method of claim 21, wherein said null data comprises a known data pattern.

28. The method of claim 21, wherein said null data does not affect use of operative data.

29. The method of claim 21, wherein said code comprises a Walsh code.

30. An apparatus for controlling communications from multiple base stations to a mobile station in a communication system, comprising:
- a transmitter for transmitting data on a reverse channel to a first base station of said multiple base stations, for puncturing said data with null data, and encoding said null data with a code assigned to a second base station of said multiple base stations, for said punctured data encoded with the code assigned to the second base station to indicate, to the first base station, a desire to switch a source of transmission of traffic data, for said mobile station, from said first base station to said second base station.

31. The apparatus of claim 30, further comprising:
a controller for switching said source of transmission of traffic data from said first base station to said second base station.

32. The apparatus of claim 30, further comprising:
a receiver for receiving a traffic data transmission from said second base station.

33. The apparatus of claim 30, further comprising:
a receiver for receiving a traffic data transmission from said first base station.

34. The apparatus of claim 30, wherein said puncturing is for a duration of at least one time frame comprising a plurality of time slots.

35. The apparatus of claim 34, wherein said puncturing includes using at least one of said plurality of time slots.

36. The apparatus of claim 30, further comprising:
means for selecting said second base station for said source of transmission of traffic data.

37. The apparatus of claim 30, wherein said null data comprises a known data pattern.

38. The apparatus of claim 30, wherein said null data does not affect use of operative data.

39. The apparatus of claim 30, wherein said code comprises a Walsh code.

40. An apparatus for controlling communications from multiple base stations to a mobile station in a communication system, comprising:
- a receiver for receiving, at a first base station of said multiple base stations, from said mobile station, data on a reverse channel, for receiving a punctured transmission of said data punctured with null data, said null data being encoded with a code assigned to a second base station of said multiple base stations to indicate, to the first base station, a desire to switch a source of transmission of traffic data, for said mobile station, from said first base station to said second base station.

41. The apparatus of claim 40, further comprising:
a controller for switching said source of transmission of traffic data from said first base station to said second base station.

42. The apparatus of claim 41, further comprising:
a transmitter for transmitting traffic data from said second base station.

43. The apparatus of claim 40, further comprising:
a transmitter for transmitting traffic data from said first base station.

44. The apparatus of claim 40, wherein said punctured transmission is for a duration of at least one time frame comprising a plurality of time slots.

45. The apparatus of claim 44, wherein said punctured transmission includes using at least one of said plurality of time slots.

46. The apparatus of claim 40, further comprising:
means for selecting said second base station for said source of transmission of traffic data.

47. The apparatus of claim 40, wherein said null data comprises a known data pattern.

48. The apparatus of claim 40, wherein said null data does not affect use of operative data.

49. The apparatus of claim 40, wherein said code comprises a Walsh code.

50. An apparatus for controlling communications from multiple base stations to a mobile station in a communication system, comprising:
a mobile station transmitter for transmitting, from said mobile station, data on a reverse channel to a first base station of said multiple base stations;
a base station receiver for receiving, at said first base station, from said mobile station, said transmission of said data on said reverse channel;
said mobile station transmitter, further for puncturing said data with null data, and encoding said null data with a code assigned to a second base station of said multiple base stations, and for transmitting, from said mobile station, said punctured data encoded with the code assigned to the second base station to indicate, to the first base station, a desire to switch a source of transmission of traffic data from said first base station to said second base station;
said base station receiver, further for receiving said punctured data; and
a controller for switching said source of transmission of traffic data from said first base station to said second base station.

51. The apparatus of claim 50, further comprising:
a mobile station receiver for receiving a traffic data transmission from said first base station.

52. The apparatus of claim 50, further comprising:
a mobile station receiver for receiving a traffic data transmission from said second base station.

53. The apparatus of claim 50, wherein said punctured data transmission is for a duration of at least one time frame comprising a plurality of time slots.

54. The apparatus of claim 53, wherein said punctured data transmission includes using at least one of said plurality of time slots.

55. The apparatus of claim 50, further comprising:
means for selecting said second base station for said source of transmission of traffic data.

56. The apparatus of claim 50, wherein said null data comprises a known data pattern.

57. The apparatus of claim 50, wherein said null data does not affect use of operative data.

58. The apparatus of claim 50, wherein said code comprises a Walsh code.

59. A computer program product for controlling communications from multiple base stations to a mobile station in a communication system, the computer program product comprising one or more tangible computer readable media, wherein said one or more tangible computer readable media are encoded with:
instructions operative to cause a computer to transmit data on a reverse channel to a first base station of said multiple base stations;
instructions operative to cause a computer to puncture said data with null data, and to encode said null data with a code assigned to a second base station of said multiple base stations; and
instructions operative to cause a computer to transmit said punctured data encoded with the code assigned to the second base station to indicate, to the first base station, a desire to switch a source of transmission of traffic data, for said mobile station, from said first base station to said second base station.

60. A computer program product for controlling communications from multiple base stations to a mobile station in a communication system, the computer program product comprising one or more tangible computer readable media, wherein said one or more tangible computer readable media are encoded with:
instructions operative to cause a computer to receive, at a first base station of said multiple base stations, from said mobile station, data on a reverse channel; and
instructions operative to cause a computer to receive a punctured transmission of said data punctured with null data, and said null data being encoded with a code assigned to a second base station of said multiple base stations, to the first base station, to indicate a desire to switch a source of transmission of traffic data, for said mobile station, from said first base station to said second base station.

61. A computer program product for controlling communications from multiple base stations to a mobile station in a communication system, the computer program product comprising one or more tangible computer readable media, wherein said one or more tangible computer readable media are encoded with:
instructions operative to cause a computer to transmit, from said mobile station, data on a reverse channel to a first base station of said multiple base stations;
instructions operative to cause a computer to receive, at said first base station, from said mobile station, said transmission of said data on said reverse channel;
instructions operative to cause a computer to puncture said data with null data, and to encode said null data with a code assigned to a second base station of said multiple base stations;
instructions operative to cause a computer to transmit, from said mobile station, said punctured data encoded with the code assigned to the second base station to indicate, to the first base station, a desire to switch a source of transmission of traffic data from said first base station to said second base station;
instructions operative to cause a computer to receive said punctured data; and
instructions operative to cause a computer to switch said source of transmission of traffic data from said first base station to said second base station.

62. An apparatus for controlling communications from multiple base stations to a mobile station in a communication system, the apparatus comprising:
transmitter means for:
transmitting data on a reverse channel to a first base station of said multiple base stations;

puncturing said data with null data;

encoding said null data with a code assigned to a second base station of said multiple base stations; and transmitting said punctured data encoded with the code assigned to the second base station to indicate, to the first base station, a desire to switch a source of transmission of traffic data, for said mobile station, from said first base station to said second base station.

63. An apparatus for controlling communications from multiple base stations to a mobile station in a communication system, the apparatus comprising:

receiver means for:

receiving, at a first base station of said multiple base stations, from said mobile station data on a reverse channel; and receiving a punctured transmission of said data punctured with null data, said null data being encoded with a code assigned to a second base station of said multiple base stations to indicate, to the first base station, a desire to switch a source of transmission of traffic data, for said mobile station, from said first base station to said second base station.

64. An apparatus for controlling communications from multiple base stations to a mobile station in a communication system, the apparatus comprising:

mobile station transmitter means for:

transmitting, from said mobile station, data on a reverse channel to a first base station of said multiple base stations;

puncturing said data with null data; and encoding said null data with a code assigned to a second base station of said multiple base stations, and for transmitting, from said mobile station, said punctured data encoded with the code assigned to the second base station to indicate, to the first base station, a desire to switch a source of transmission of traffic data from said first base station to said second base station;

base station receiver means for:

receiving, at said first base station, from said mobile station, said transmission of said data on said reverse channel; and receiving a punctured transmission of said data punctured with null data; and controller means for switching said source of transmission of traffic data from said first base station to said second base station.

* * * * *